United States Patent
Ogata et al.

(10) Patent No.: US 12,093,505 B2
(45) Date of Patent: Sep. 17, 2024

(54) DISPLAY CONTROL DEVICE AND METHOD FOR DISPLAYING INSTRUCTIONS TO VEHICLE OCCUPANTS

(71) Applicant: TOYOTA JIDOSHA KABUSHIKI KAISHA, Toyota (JP)

(72) Inventors: Ryo Ogata, Toyota (JP); Satoaki Takabatake, Nisshin (JP); Koji Kimura, Nagoya (JP); Junji Miyazaki, Nagoya (JP); Yuki Yoshida, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/024,969

(22) Filed: Sep. 18, 2020

(65) Prior Publication Data
US 2021/0173531 A1    Jun. 10, 2021

(30) Foreign Application Priority Data

Dec. 6, 2019   (JP) .................................. 2019-221559

(51) Int. Cl.
*G06F 3/0482* (2013.01)
*B60K 35/29* (2024.01)
(Continued)

(52) U.S. Cl.
CPC .......... *G06F 3/0482* (2013.01); *G06F 3/0484* (2013.01); *B60K 35/29* (2024.01);
(Continued)

(58) Field of Classification Search
CPC ................. G06F 3/0482; G06F 3/0484; G06F 2203/04803; B60K 2370/199; B60W 50/14; B60W 2050/146; G02B 2027/014
See application file for complete search history.

(56) References Cited

U.S. PATENT DOCUMENTS

| | | | |
|---|---|---|---|
| 2007/0016876 A1* | 1/2007 | Schultz | G06F 9/451 |
| | | | 715/802 |
| 2010/0042684 A1* | 2/2010 | Broms | G06F 3/0483 |
| | | | 715/764 |

(Continued)

FOREIGN PATENT DOCUMENTS

| | | |
|---|---|---|
| CN | 106573540 A | 4/2017 |
| EP | 3 160 788 A0 | 5/2017 |

(Continued)

OTHER PUBLICATIONS

Extended European Search Report issued Feb. 15, 2021 in European Patent Application No. 20196881.5, citing documents AO through AT therein, 8 pages.

*Primary Examiner* — Roberto Borja
(74) *Attorney, Agent, or Firm* — Oblon, McClelland, Maier & Neustadt, L.L.P.

(57) ABSTRACT

A display control device includes a processor. The processor being configured to: receive proposal information relating to a proposal that requests an instruction from a vehicle occupant of a vehicle; receive an operation signal that is outputted in accordance with an operation of the vehicle occupant; and in a case of receiving the proposal information, change display of a display device provided within the vehicle from a usual image to an image that includes a proposal image relating to the proposal, and, during a predetermined time period from start of display of the proposal image, prohibit reflection of the operation signal in the instruction.

17 Claims, 9 Drawing Sheets

(51) Int. Cl.
    *B60W 50/14*     (2020.01)
    *G06F 3/0484*     (2022.01)
    *G02B 27/01*     (2006.01)

(52) U.S. Cl.
    CPC ........ *B60K 2360/199* (2024.01); *B60W 50/14* (2013.01); *B60W 2050/146* (2013.01); *G02B 2027/014* (2013.01); *G06F 2203/04803* (2013.01)

(56) References Cited

U.S. PATENT DOCUMENTS

| | | | |
|---|---|---|---|
| 2012/0096979 A1* | 4/2012 | Trujillo Linke | B62D 1/046 74/552 |
| 2013/0117706 A1* | 5/2013 | Takenaka | G06F 3/04812 715/781 |
| 2013/0190977 A1* | 7/2013 | Onaka | B60K 37/02 701/36 |
| 2015/0283904 A1* | 10/2015 | Schlittenbauer | B60K 35/00 345/173 |
| 2015/0367730 A1 | 12/2015 | Wagner et al. | |
| 2016/0054822 A1 | 2/2016 | Suzuki | |
| 2016/0274717 A1* | 9/2016 | Wako | G06F 3/0488 |
| 2018/0059920 A1* | 3/2018 | Edmonds | G06F 3/04886 |
| 2018/0093676 A1* | 4/2018 | Emura | G05D 1/0257 |
| 2018/0118208 A1 | 5/2018 | Inoguchi et al. | |
| 2018/0273050 A1 | 9/2018 | Tertoolen et al. | |
| 2018/0281818 A1* | 10/2018 | Ebina | B60W 30/14 |
| 2021/0088351 A1* | 3/2021 | Kassner | G02B 27/01 |

FOREIGN PATENT DOCUMENTS

| | | | | |
|---|---|---|---|---|
| EP | 3 315 375 A1 | 5/2018 | | |
| JP | 2014-197352 A | 10/2014 | | |
| JP | 2017-7409 A | 1/2017 | | |
| JP | 2019-144874 A | 8/2019 | | |
| JP | 2019-147546 A | 9/2019 | | |
| WO | WO-2012079779 A1 * | 6/2012 | ............... | G06F 8/38 |
| WO | WO 2015/197803 A2 | 12/2015 | | |

* cited by examiner

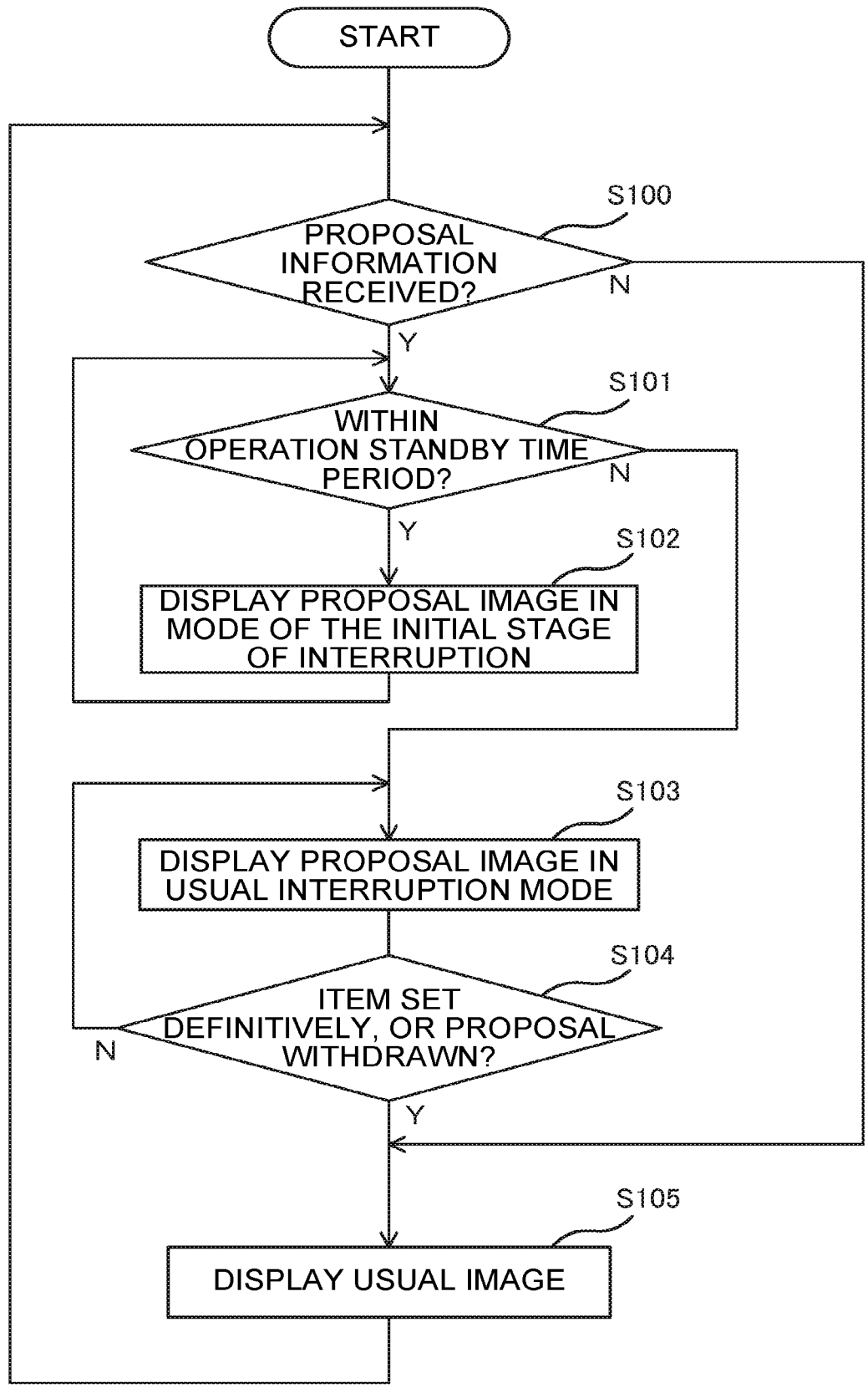

DISPLAY CONTROL DEVICE AND METHOD FOR DISPLAYING INSTRUCTIONS TO VEHICLE OCCUPANTS

CROSS-REFERENCE TO RELATED APPLICATION

This application is based on and claims priority under 35 USC 119 from Japanese Patent Application No. 2019-221559, filed on Dec. 6, 2019, the disclosure of which is incorporated by reference herein.

BACKGROUND

Technical Field

The present disclosure relates to a display control device, a vehicle, a display control method, and a storage medium storing a program.

Related Art

Japanese Patent Application Laid-Open (JP-A) No. 2019-147546 discloses, in a head-up display (HUD) device, a display controlling means for displaying plural operation instruction images that express the contents of respectively different operation instructions such that, the later in the order of operation by the operator that the operation instruction contents express, the further toward the upper side of a display area that the operation instruction image is displayed.

However, the device of JP-A No. 2019-147546 assumes that a proposal, which relates to a function of the vehicle and requests an instruction, is displayed on a head-up display while the driver is in the midst of carrying out operation with respect to information that is displayed in the head-up display.

In this case, there is the concern that the driver may carry out an unintended operation with respect to the proposal that is newly displayed, and that an instruction will be executed in accordance with contents that were selected unintentionally.

SUMMARY

An object of the present disclosure is to provide a display control device, a vehicle, a display control method, and a storage medium storing a program that, in a case in which a new proposal that involves an instruction is displayed on a display device while a vehicle occupant is carrying out an operation with respect to information that is being displayed on the display device, can suppress erroneous operation by the vehicle occupant with respect to that proposal.

A first aspect is a display control device including: a receiving section that receives proposal information relating to a proposal that requests an instruction from a vehicle occupant of a vehicle; an input section to which an operation signal, which is outputted in accordance with an operation of the vehicle occupant, is inputted; and a control section that, in a case in which the receiving section receives the proposal information, changes display of a display device provided within the vehicle from a usual image to an image that includes a proposal image relating to the proposal, and, during a predetermined time period from start of display of the proposal image, prohibits reflection of the operation signal in the instruction.

In the display control device of the first aspect, for example, when a proposal, which relates to a function of the vehicle and requests an instruction, is given to a vehicle occupant from a device that relates to that function, the proposal information is received at the receiving section. Then, the control section changes the display of a display device, which is provided within the vehicle, from a usual image to an image that includes a proposal image relating to the proposal. A case in which the proposal image is displayed instead of the usual image, a case in which the proposal image is superposed on the usual image, and a case in which the proposal image is displayed so as to be lined-up with the usual image, are modified examples of the display by the control section.

Here, "proposal that requests an instruction" means requesting the vehicle occupant to operate the operation device, such as a switch or a touch pad or the like, in a case when an instruction from the vehicle occupant with respect to a function of the vehicle is needed. Further, the "usual image" includes images that relate to information of the vehicle or of devices installed in the vehicle, and images at which the vehicle occupant gives instructions with respect to functions of the vehicle that are unrelated to proposals. Moreover, "proposal image" is an image in which an instruction can be given with respect to the proposal by operation of the vehicle occupant.

Further, during the predetermined time period from the start of display of the proposal image, the control section prohibits the operation, which is carried out by the vehicle occupant, from being reflected in the instruction. "Prohibits the operation from being reflected in the instruction" includes both a case in which, even if an operation signal is inputted to the input section, the operation signal is not reflected in the control of the control section, and a case in which inputting of the operation signal to the input section itself is stopped. In accordance with this display control device, in a case in which a new proposal that involves an instruction is displayed on the display device during operation of the vehicle occupant with respect to information that is being displayed on the display device, the operation of the vehicle occupant, which is carried out on the information that was displayed first, being erroneously reflected in the instruction for the new proposal is suppressed.

In a display control device of a second aspect, in the display control device of the first aspect, the proposal image includes a contents image that is an image showing contents of the proposal, an item image that is an image of plural items that can be selected, and an instruction display that indicates one of the items in correspondence with a selecting operation of the vehicle occupant with respect to the proposal, and, in a case in which the receiving section receives the proposal information, the control section displays the contents image at the display device, and, during a time period in which reflection of the operation signal in the instruction is prohibited, displays the item image in a greyed-out manner and does not carry out the instruction display.

In the display control device of the second aspect, during the time period in which reflecting of the operation signal in the instruction is prohibited, the control section displays the item image in a greyed-out manner, and does not carry out instruction display with respect to the items. In accordance with this display control device, in a case in which a new proposal that involves an instruction is displayed on the display device during the selecting operation of the vehicle occupant on information that is being displayed on the display device, the vehicle occupant can be made to recognize the contents of the proposal, while the vehicle occupant is shown that the selecting operation is not reflected in the instruction.

In a display control device of a third aspect, in the display control device of the first aspect, the proposal image includes a contents image that is an image showing contents of the proposal, an item image that is an image of plural items that can be selected, and an instruction display that indicates one of the items in correspondence with a selecting operation of the vehicle occupant with respect to the proposal, and, in a case in which the receiving section receives the proposal information, the control section displays the contents image at the display device, and, during a time period in which reflection of the operation signal in the instruction is prohibited, displays the item image and does not carry out the instruction display.

In the display control device of the third aspect, during the time period in which reflecting of the operation signal in the instruction is prohibited, the control section displays the item image, and does not carry out instruction display with respect to the items. In accordance with this display control device, in a case in which a new proposal that involves an instruction is displayed on the display device during the selecting operation of the vehicle occupant on information that is being displayed on the display device, the vehicle occupant can be made to recognize the contents of the proposal and the items that can be selected, while the vehicle occupant is shown that the selecting operation is not reflected in the instruction.

In a display control device of a fourth aspect, in the display control device of the first aspect, the proposal image includes a contents image that is an image showing contents of the proposal, an item image that is an image of plural items that can be selected, and an instruction display that indicates one of the items in correspondence with a selecting operation of the vehicle occupant with respect to the proposal, and, in a case in which the receiving section receives the proposal information, the control section displays the contents image at the display device, and, during a time period in which reflection of the operation signal in the instruction is prohibited, does not display the item image and does not carry out the instruction display.

In the display control device of the fourth aspect, during the time period in which reflecting of the operation signal in the instruction is prohibited, the control section does not display the item image, and does not carry out instruction display with respect to the items. In accordance with this display control device, in a case in which a new proposal that involves an instruction is displayed on the display device during the selecting operation of the vehicle occupant on information that is being displayed on the display device, the vehicle occupant can first be made to recognize only the contents of the proposal.

In a display control device of a fifth aspect, in the display control device of the first aspect, the proposal image includes a contents image that is an image showing contents of the proposal, an item image that is an image of plural items that can be selected, and an instruction display that indicates one of the items in correspondence with a selecting operation of the vehicle occupant with respect to the proposal, and, in a case in which the receiving section receives the proposal information, the control section displays the contents image at the display device, and, during a time period from receipt of the proposal information until elapsing of a time period in which reflection of the operation signal in the instruction is prohibited, completes fading-in of the item image at which the instruction display is carried out.

In the display control device of the fifth aspect, during the time period from receipt of the proposal information until elapsing of the time period in which reflecting of the operation signal in the instruction is prohibited, the control section completes the fading-in of the item image in which the instruction display is carried out with respect to the items. In accordance with this display control device, in a case in which a new proposal that involves an instruction is displayed on the display device during the selecting operation of the vehicle occupant on information that is being displayed on the display device, the vehicle occupant can, by the movements of the item image and the instruction display, be made to understand the passage of the time period during which the selecting operation is not reflected.

In a display control device of a sixth aspect, in the display control device of the first aspect, the proposal image includes a contents image that is an image showing contents of the proposal, an item image that is an image of plural items that can be selected, and an instruction display that indicates one of the items in correspondence with a selecting operation of the vehicle occupant with respect to the proposal, and in a case in which the receiving section receives the proposal information, the control section displays the contents image at the display device, and, after elapsing of a time period in which reflection of the operation signal in the instruction is prohibited, starts fading-in of the item image at which the instruction display is carried out.

In the display control device of the sixth aspect, after elapsing of the time period in which reflecting of the operation signal in the instruction is prohibited, the control section starts fading-in of the item image at which instruction display is carried out with respect to the items. In accordance with this display control device, in a case in which a new proposal that involves an instruction is displayed on the display device during the selecting operation of the vehicle occupant on information that is being displayed on the display device, the vehicle occupant can be made to recognize, by the movements of the item image and the instruction display, that the selecting operation is reflected in the instruction.

In a display control device of a seventh aspect, in the display control device of the first aspect, the proposal image includes a contents image that is an image showing contents of the proposal, an item image that is an image of plural items that can be selected, and an instruction display that indicates one of the items in correspondence with a selecting operation of the vehicle occupant with respect to the proposal, and, in a case in which the receiving section receives the proposal information, the control section displays the contents image at the display device, and, during a time period in which reflection of the operation signal in the instruction is prohibited, starts fading-in of the item image at which the instruction display is carried out.

In the display control device of the seventh aspect, the control section starts the fading-in of the item image at which instruction display is carried out with respect to the items, from a given point in time within the time period in which reflection of the operation signal in the instruction is prohibited. In accordance with this display control device, in a case in which a new proposal that involves an instruction is displayed on the display device during the selecting operation of the vehicle occupant on information that is being displayed on the display device, the vehicle occupant can, by the movements of the item image and the instruction display, be made to know in a short time that the selecting operation is reflected.

In a display control device of an eighth aspect, in the display control device of any one of the first through seventh aspects, the display device includes a first display portion that can be seen by the vehicle occupant, and a second display portion that is displayed above the first display portion and on a sightline of the vehicle occupant, and the control section displays the usual image only on the first display portion, and displays the usual image and the proposal image on both the first display portion and the second display portion.

In accordance with the display control device of the eighth aspect, the control section displays the proposal image on, among the first display portion and the second display portion, only the second display portion that is on the sightline of the vehicle occupant. Due thereto, the vehicle occupant can be made to know that there is a new proposal that involves an instruction of the vehicle occupant.

A ninth aspect is a vehicle including: the display control device of any one of the first through eighth aspects; an operation device that receives operation of the vehicle occupant; and the display device.

In accordance with the vehicle of the ninth aspect, for example, in a case in which, in the midst of a selecting operation relating to a comfort function, such as the audio system or the air conditioner or the like, in the usual image, a proposal image relating to a traveling function such as lane change assist or the like is given by a proposal image, the selecting operation of the vehicle occupant is not reflected in the traveling function during the predetermined time period. Namely, in accordance with this vehicle, erroneous operation, in which the selecting operation of the vehicle occupant with respect to a comfort function is erroneously reflected in an instruction with respect to a traveling function, is suppressed.

A tenth aspect is a display control method including: receiving processing that receives proposal information relating to a proposal that requests an instruction from a vehicle occupant of a vehicle; inputting processing in which an operation signal, which is outputted in accordance with an operation of the vehicle occupant, is inputted; and controlling processing that, in a case of receiving the proposal information in the receiving processing, changes display of a display device provided within the vehicle from a usual image to an image that includes a proposal image relating to the proposal, and, during a predetermined time period from start of display of the proposal image, prohibits reflection of the operation signal in the instruction.

In the display control method of the tenth aspect, for example, when a proposal which relates to a function of the vehicle and requests an instruction, is given to the vehicle occupant from a device that relates to that function, the proposal information is received in the receiving processing. Then, in the controlling processing, a display device, which is provided within the vehicle, changes display of a usual image to display of an image that includes a proposal image relating to the proposal. Here, modified examples of display in the controlling processing are as described above. Further, the definitions of "instruction", "usual image", and "proposal image" are the same as described above.

In the controlling processing, the operation that the vehicle occupant carries out being reflected in the instruction is prohibited during the predetermined time period from the start of display of the proposal image. In accordance with this display control method, in a case in which a new proposal that involves an instruction is displayed during operation of the vehicle occupant with respect to information that is being displayed on the display device, the operation of the vehicle occupant, which is carried out with respect to the information that was displayed first, being erroneously reflected in the instruction for the new proposal is suppressed.

An eleventh aspect is a non-transitory storage medium storing a program. The program causes a computer to execute processings including: receiving processing that receives proposal information relating to a proposal that requests an instruction from a vehicle occupant of a vehicle; inputting processing in which an operation signal, which is outputted in accordance with an operation of the vehicle occupant, is inputted; and controlling processing that, in a case of receiving the proposal information in the receiving processing, changes display of a display device provided within the vehicle from a usual image to an image that includes a proposal image relating to the proposal, and, during a predetermined time period from start of display of the proposal image, prohibits reflection of the operation signal in the instruction.

In the program that is storing on the non-transitory storage medium of the eleventh aspect, the following processings are executed at a computer. Namely, for example, when a proposal, which relates to a function of the vehicle and requests an instruction, is given to a vehicle occupant, the proposal information is received in the receiving processing. Then, in the controlling processing, a display device, which is provided within the vehicle, changes display of a usual image to display of an image that includes a proposal image relating to the proposal. Here, modified examples of display in the controlling processing are as described above. Further, the definitions of "instruction", "usual image", and "proposal image" are the same as described above.

Further, in the controlling processing, the operation that is carried out by the vehicle occupant being reflected in the instruction is prohibited during the predetermined time period from the start of display of the proposal image. In accordance with this program, in a case in which a new proposal that involves an instruction is displayed during operation of the vehicle occupant with respect to information that is being displayed on the display device, the operation of the vehicle occupant, which is carried out with respect to the information that was displayed first, being erroneously reflected in the instruction for the new proposal is suppressed.

In accordance with the present disclosure, in a case in which a new proposal that involves an instruction is displayed on a display device while a vehicle occupant is carrying out an operation with respect to information that is being displayed on the display device, erroneous operation by the vehicle occupant with respect to that proposal can be suppressed.

BRIEF DESCRIPTION OF THE DRAWINGS

Exemplary embodiments of the present disclosure will be described in detail based on the following figures, wherein:

FIG. 6 is a flowchart showing the flow of proposing processings that are executed in the first embodiment;

DETAILED DESCRIPTION

Vehicle control systems relating to embodiments of the present disclosure are described by using FIG. 1 through FIG. 6. Note that "in front" in FIG. 1 means the front side when the vehicle front side is observed from the vehicle rear side.

First Embodiment

Figure 1:
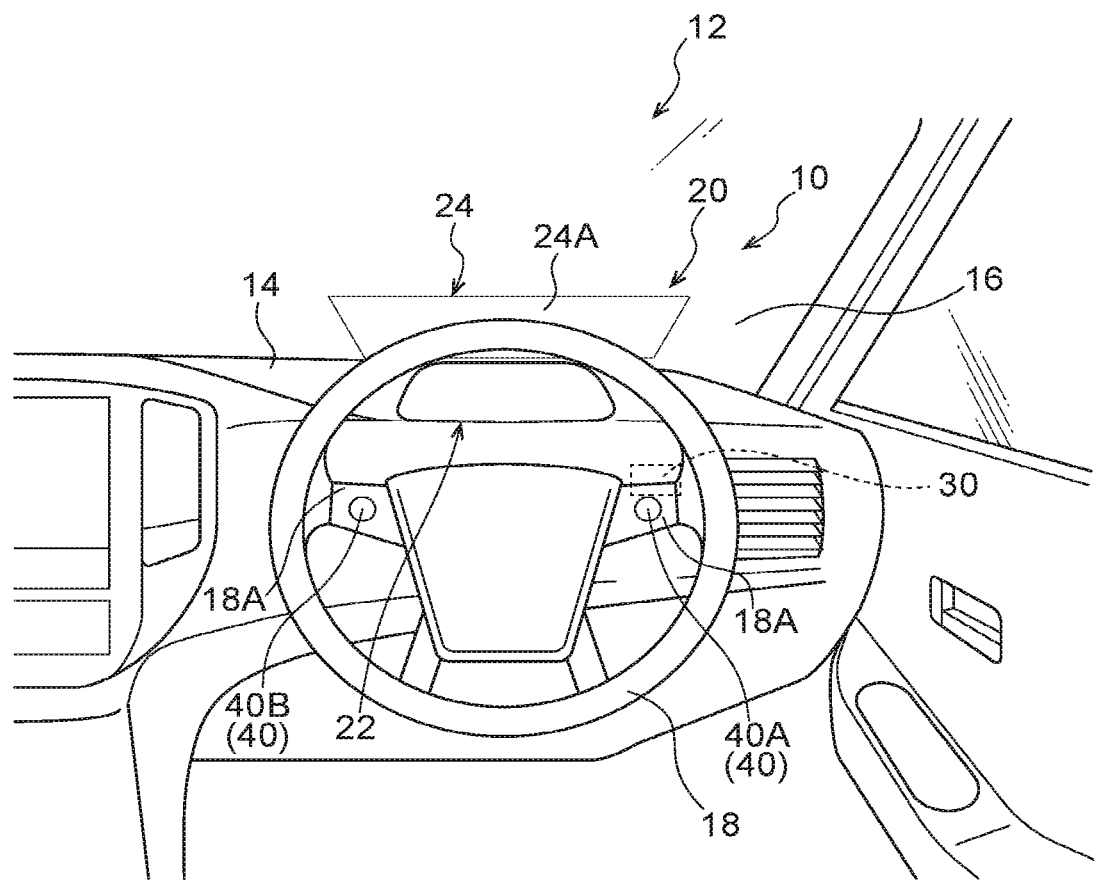
FIG. 1 is a front view of a vehicle control system relating to a first embodiment, and includes a display device and a steering wheel that are provided at a driver's seat.
Figure 2:
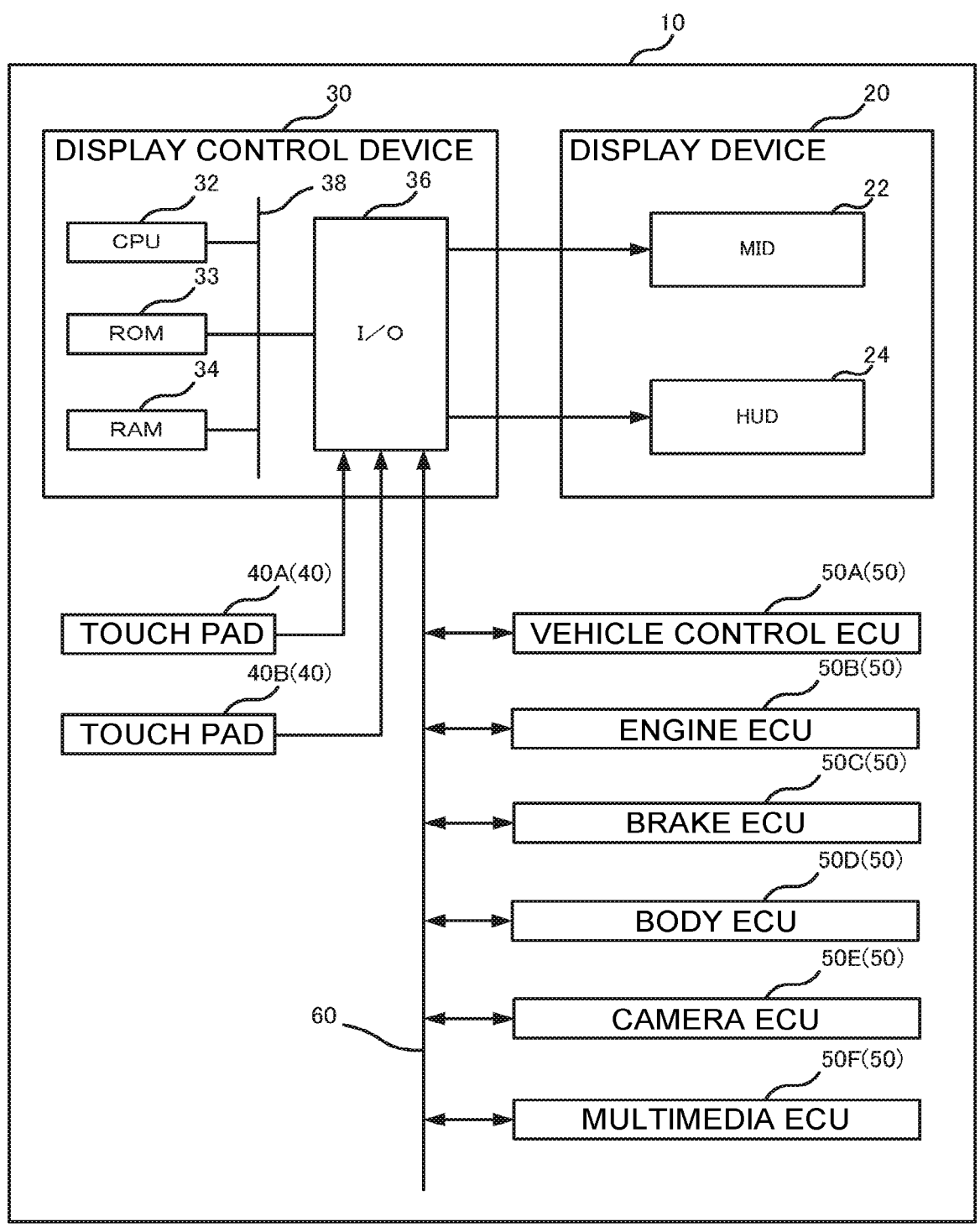
FIG. 2 is a block diagram showing hardware structures of the vehicle control system relating to the first embodiment.

A vehicle control system 10 of a first embodiment is shown in FIG. 1 and FIG. 2. The vehicle control system 10 of the present embodiment is structured to include a display device 20, a display control device 30, touch pads 40, and respective ECUs (Electronic Control Units) 50.

As shown in FIG. 1, the display device 20 is provided in front of the driver at the driver's seat of a vehicle 12. The display device 20 has a MID (Multi Information Display) 22 that serves as a first display portion which the driver can see, and a HUD (Head-Up Display) 24 that serves as a second display portion that is displayed adjacent to and at the vehicle upper side of the MID 22 on the sightline of the driver.

To describe this further, the MID 22 of the present embodiment is a liquid crystal screen that is provided at the front surface of a dashboard 14. The HUD 24 of the present embodiment has a projection device at the interior of the dashboard 14, and an image is projected from this projection device onto a projection screen 24A that is set at a front window 16 that is a projection surface. Note that the projection surface of the HUD 24 is not limited to the front window 16, and a combiner (reflection plate) that is provided at the dashboard 14 may be used as the projection surface.

The display control device 30 is provided at the interior of the dashboard 14 in a vicinity of the display device 20. As shown in FIG. 2, the display control device 30 has a CPU (Central Processing Unit) 32 that is an example of the processor that is hardware, a ROM (Read Only Memory) 33, a RANI (random Access Memory) 34, and an input/output interface (I/O) 36. The CPU 32, the ROM 33, the RAM 34 and the I/O 36 are connected to one another via a bus 38. Note that, in addition to the ROM 33 or in place of the ROM 33, the display control device 30 may have a non-volatile memory such as an HDD (Hard Disk Drive), an SSD (Solid State Drive), or the like.

Figure 3:
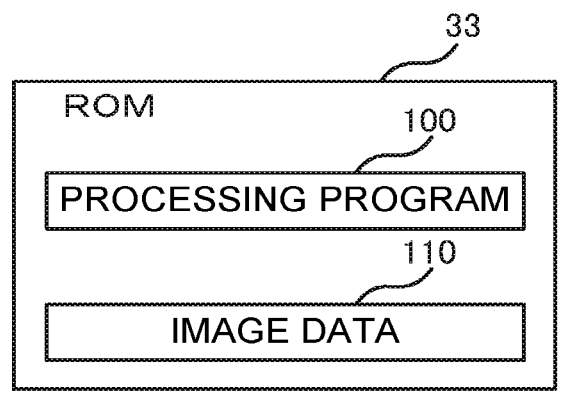
FIG. 3 is a block diagram showing an example of the structure of a ROM relating to the first embodiment.
Figure 4:
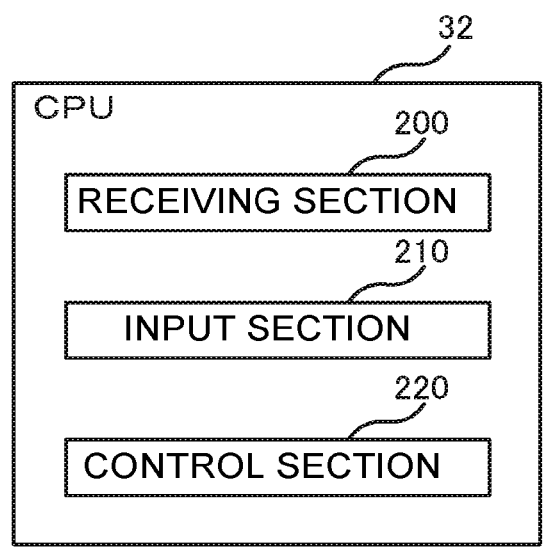
FIG. 4 is a block diagram showing an example of functional structures of a CPU relating to the first embodiment.

As shown in FIG. 3, a processing program 100 for causing the CPU 32 to execute proposing processing, and image data 110 that relates to an image that is to be displayed on the display device 20, are stored in the ROM 33. The CPU 32 reads-out the processing program 100 from the ROM 33, and expands it in the RAM 34. Then, due to the CPU 32 loading and executing the processing program 100, the CPU 32 functions as a receiving section 200, an input section 210 and a control section 220 that are shown in FIG. 4. The CPU 32 is an example of the processor.

As shown in FIG. 2, the MID 22 and the HUD 24 that structure the display device 20 are connected to the I/O 36. Further, the touch pads 40 and the ECUs 50 are connected to the I/O 36.

As shown in FIG. 1, the touch pads 40 that serve as operation devices are disposed at left and right spoke portions 18A of a steering wheel 18, respectively. The touch pads 40 include a touch pad 40A that is disposed at the right side of the steering wheel 18, and a touch pad 40B that is disposed at the left side of the steering wheel 18.

Each of the touch pads 40 is formed in a circular shape as seen from the driver's seat side. The operation surfaces, which are the surfaces that are exposed at the driver's seat side, of the touch pads 40 are electrostatic capacitance type sensors, and can be operated by being swiped by the fingers (here, the thumbs) of the driver. Note that the touch pads 40 are not limited to an electrostatic capacitance type, and may be of an arbitrary type such as a resistive film type, a surface acoustic wave type, an infrared light type, an electromagnetic induction type, or the like.

Further, in the present embodiment, the touch pads 40 themselves are push switches, and can be operated by being pushed by the fingers of the driver. When the driver grips the steering wheel 18, the touch pads 40 of the present embodiment can be operated by the thumbs. Settings relating to the functions of the vehicle 12 can be carried out by the touch pads 40.

In the present embodiment, in the proposing processing that is described later, an item relating to a proposal can be selected by swiping on the touch pad 40A, and the selected item can be definitively set by the touch pad 40A being pressed. Note that the touch pad 40 that is used in the proposing processing is not limited to the touch pad 40A, and the touch pad 40B may be used instead of the touch pad 40A, or in addition to the touch pad 40A.

As shown in FIG. 2, the ECUs 50 of the present embodiment include, for example, a vehicle control ECU 50A, an engine ECU 50B, a brake ECU 50C, a body ECU 50D, a camera ECU 50E, and a multimedia ECU 50F. These ECUs 50 are connected via a CAN (Controller Area Network) 60. Note that the method of connection is not limited to this, and the respective ECUs 50 may be connected via a gateway ECU for example. Further, the connection system is not limited to CAN, and LAN standards such as Ethernet (registered trademark) or the like may be employed.

The vehicle control ECU 50A controls the traveling functions such as VSC (Vehicle Stability Control), traction control, the lane keeping system, lane change assist and the like. The vehicle control ECU 50A realizes the traveling functions of the vehicle 12 in cooperation with the other ECUs 50 such as the engine ECU 50B, the brake ECU 50C, the camera ECU 50E, and the like.

The engine ECU 50B controls the output of the engine. The engine ECU 50B acquires the vehicle speed and the engine speed of the vehicle 12 in order to control the engine. In the present embodiment, the vehicle speed and the engine speed are transmitted from the engine ECU 50B to the I/O 36.

The brake ECU 50C controls the brakes. For example, at the time when the cruise control function is operated, the brake ECU 50C controls the braking of the respective wheels in order for the vehicle 12 to travel at a preset vehicle speed, or in order to maintain constant the vehicle-to-vehicle distance between the vehicle 12 and the preceding vehicle.

The body ECU 50D controls the respective lights including the headlights, and the power windows and the like. The vehicle 12 of the present embodiment has automatic lights that turn on and off automatically in accordance with the illuminance at the exterior of the vehicle.

The camera ECU 50E has the function of sensing the situation at the periphery of the vehicle 12 on the basis of information acquired from various sensors such as cameras, millimeter-wave radar, LIDAR (Light Detection and Ranging/Laser Imaging Detection and Ranging), and the like that are provided at the exterior of the vehicle 12. Due to the camera ECU 50E sensing a preceding vehicle, which is traveling in front of the vehicle 12, on the basis of information acquired from the various sensors, the vehicle control ECU 50A can, on the basis of this sensed information, carry out traveling by tracking while maintaining constant the vehicle-to-vehicle distance between the vehicle 12 and the preceding vehicle. The camera ECU 50E transmits the situations at the peripheries of the preceding vehicle and the vehicle 12 to the I/O 36 as sensed information.

The multimedia ECU 50F controls the car navigation system and the audio system. On the basis of operations of the driver, the multimedia ECU 50F changes the map display screen, selects music, adjusts the volume, and the like.

FIG. 4 is a block diagram showing an example of the functional structures of the CPU 32 at the display control device 30.

The receiving section 200 has the function of receiving proposal information that relates to a proposal that requests an instruction from the driver of the vehicle. Here, "proposal that requests an instruction" means requesting that the driver operate the touch pad 40 in a case in which an instruction from the driver relating to a function of the vehicle 12 is needed. Further, "operate" is operations with respect to the touch pad 40, and includes both swiping operation that serves as a selecting operation, and pushing operation that serves as a definitive setting operation.

The receiving section 200 of the present embodiment receives proposal information from the respective ECUs 50 that are at the exterior of the display control device 30. For example, in a case in which a proposal is made as to whether or not to effect a lane change during operation of the lane change assist, the receiving section 200 receives proposal information relating to that proposal from the vehicle control ECU 50A. Further, in a case in which the display control device 30 itself makes a proposal that requests an instruction, the receiving section 200 acquires the proposal information from the control section 220. For example, in a case in which a proposal is made relating to adjusting the time of the clock displayed on the MID 22, the receiving section 200 acquires the proposal information that relates to this proposal from the control section 220.

Operation signals that are outputted in accordance with operations of the driver are inputted to the input section 210. Concretely, operation signals that are outputted when the touch pads 40 are swiped or when the touch pads 40 are pushed are inputted to the input section 210 via the I/O 36.

The control section 220 has the function of carrying out control relating to display on the display device 20, and carrying out instructions relating to various proposals. Usually, the control section 220 displays a usual image 90 only on the MID 22 of the display device 20. The usual image 90 includes images relating to the vehicle 12 or devices that are installed in the vehicle 12, and images for the driver to give instructions with respect to the functions of the vehicle irrespective of proposals (FIG. 5C).

Further, in a case in which the receiving section 200 receives proposal information, the control section 220 changes the display of the display device 20 that is provided within the vehicle from the usual image 90 to an image that includes a proposal image 80. The proposal image 80 is an image that enables instruction, by operation of the driver, with respect to the proposal relating to the received proposal information.

Figure 5A:
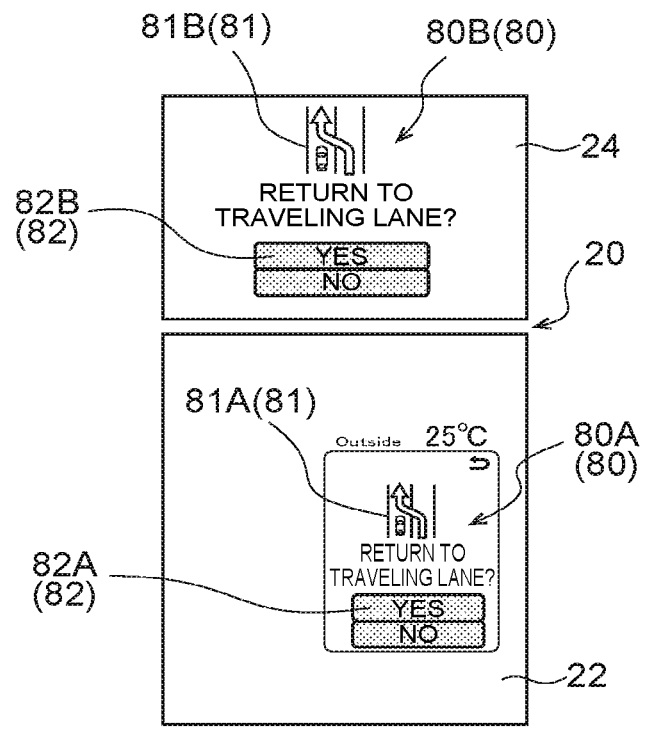
FIG. 5A is a drawing showing examples of images displayed on a display device of the first embodiment, and shows proposal images in a mode of the initial stage of interruption.
Figure 5B:
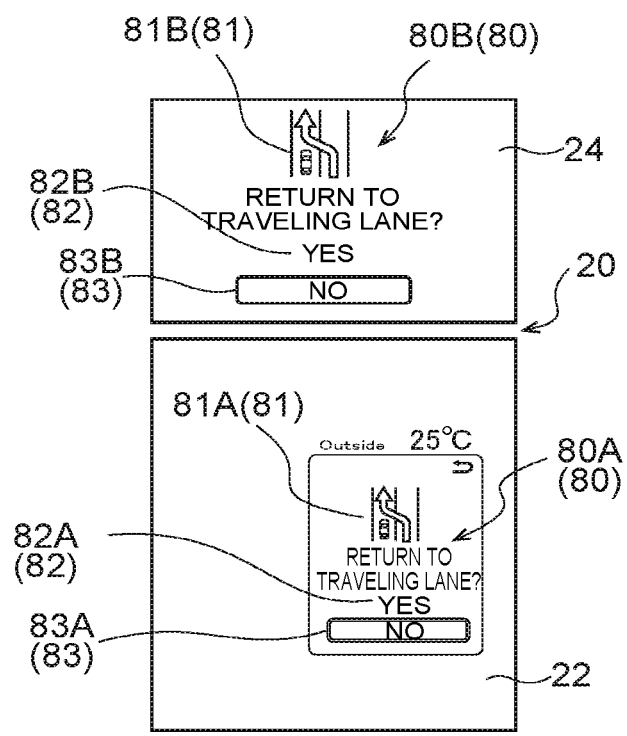
FIG. 5B is a drawing showing examples of images displayed on the display device of the first embodiment, and shows proposal images of a usual interruption mode.
Figure 5C:
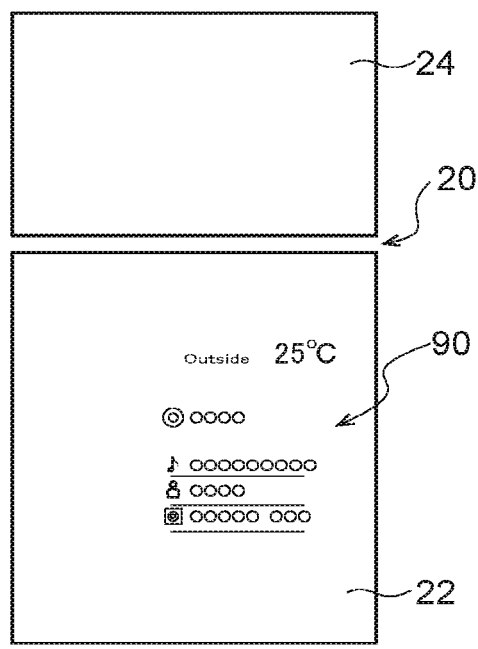
FIG. 5C is a drawing showing an example of an image displayed on the display device of the first embodiment, and shows a usual image.

For example, as shown in FIG. 5A and FIG. 5B, the proposal image 80 includes a contents image 81 that is an image showing the contents of the proposal, an item image 82 that is an image of plural items that can be selected, and an instruction display 83 that is a display by which one item is indicated in accordance with the selecting operation of the driver for that proposal. The contents image 81 includes characters and graphics and the like. The item image 82 is displayed as a list of plural items. The instruction display 83 is display that is carried out on the item image 82, such as a cursor that surrounds the one item, a pointer, highlighting, color reversal or the like in the item image 82.

The control section 220 of the present embodiment displays the proposal image 80 on both the MID 22 and the HUD 24 (see FIG. 5A and FIG. 5B). Here, the proposal image 80 that is displayed on the MID 22 is indicated as proposal image 80A, and the proposal image 80 that is displayed on the HUD 24 is indicated as proposal image 80B. The proposal image 80A includes contents image 81A, item image 82A and instruction display 83A, and the proposal image 80B includes contents image 81B, item image 82B and instruction display 83B. Note that, accompanying operation of the touch pad 40, the instruction display 83A moves between the items of the item image 82A, and the instruction display 83B moves between the items of the item image 82B. However, the instruction display 83A and the instruction display 83B always show the same item.

When proposal information is received, the control section 220 of the present embodiment causes the display device 20 to display the contents image 81. During an operation standby time period that is described later, the control section 220 displays the item image 82 in a greyed-out manner, and does not carry out the instruction display 83 (see FIG. 5A).

Further, during the operation standby time period from the start of display of the proposal image 80, the control section 220 prohibits the operation signal from being reflected in the instruction. Here, "operation standby time period" is a time period in which the driver can recognize the contents of the proposal, or is a time period in which the driver can recognize that a new proposal has arisen. The operation standby time period corresponds to the "predetermined time period" of the present disclosure. "Prohibits reflection of the operation signal in the instruction" means both a case in which, even if an operation signal is inputted at the input section 210, that operation signal is not reflected in the control of the control section 220, and a case in which inputting of the operation signal at the input section 210 itself is stopped.

(Operation)

An example of the proposing processing at the vehicle control system 10 of the present embodiment is described next. FIG. 6 is an example of the flow in a case in which proposing processing relating to lane change assist is executed.

In step S100 of FIG. 6, the CPU 32 determines whether or not proposal information has been received. Here, in a case in which the proposal "return to traveling lane" is made, the CPU 32 determines whether or not proposal information has been received from the vehicle control ECU 50A. If the CPU 32 determines that proposal information has been received, the routine moves on to step S101. On the other hand, if the CPU 32 determines that proposal information has not been received, the routine moves on to step S105.

In step S101, the CPU 32 determines whether or not the current time is within the operation standby time period. If the CPU 32 determines that the current time is within the operation standby time period, the routine moves on to step S102. On the other hand, if the CPU 32 determines that the current time is not within the operation standby time period, i.e., that the operation standby time period has elapsed, the routine moves on to step S103.

In step S102, the CPU 32 displays the proposal image 80 in a mode of the initial stage of interruption. Concretely, in the mode of the initial stage of interruption, the CPU 32 displays the contents image 81, greys-out the item image 82, and does not display the instruction display 83, on the MID 22 and the HUD 24 (see FIG. 5A). In this case, at the MID 22, the proposal image 80 is displayed instead of the usual image 90. Then, the routine returns to step S101. Namely, display of the proposal image 80 in accordance with the mode of the initial stage of interruption is continued until the operation standby time period elapses. In the mode of the initial stage of interruption, the operation signal of the touch pad 40 is not reflected in the instruction, and, even if the driver operates the touch pad 40, the instruction display 83 does not appear on the MID 22 and the HUD 24.

In step S103, the CPU 32 displays the proposal image 80 in the usual interruption mode. Concretely, in the usual interruption mode, the CPU 32 displays the contents image 81 and displays the item image 82 that has the instruction display 83, on the MID 22 and the HUD 24 (see FIG. 5B). In the usual interruption mode, because the operation signal of the touch pad 40 is reflected in the instruction, the instruction display 83 that is displayed on the MID 22 and the HUD 24 moves between items due to the driver operating the touch pad 40.

In step S104, the CPU 32 determines whether or not there has been definitive setting of an item or a withdrawal of the proposal. The definitive setting of an item corresponds to a case in which the touch pad 40 is pushed and the selected item is set definitively. Further, the withdrawal of the proposal corresponds to a case in which the touch pad 40 is not operated regardless of the facts that proposal information has been received and the operation standby time period is elapsing, or a case in which the driver himself/herself effects a lane change into the traveling lane. When the CPU 32 determines that there has been definitive setting of an item or a withdrawal of the proposal, the routine moves on to step S105. On the other hand, if the CPU 32 determines that there is no definitive setting of an item or withdrawal of the proposal, the routine returns to step S103.

In step S105, the CPU 32 displays the usual image 90. This usual image 90 is displayed only on the MID 22 (see FIG. 5C). Then, the routine returns to step S100, and processings to step S105 are repeated.

(Synopsis)

In accordance with the present embodiment, due to the proposal image 80 being displayed only on the HUD 24 that is on the sightline of the driver among the MID 22 and the HUD 24, the driver can be made to understand that the proposal image 80 is a new proposal that involves the instruction of the driver.

Further, a case is considered in which, for example, in the vehicle 12 of the present embodiment, in the midst of a selecting operation relating to a comfort function, such as the audio system or the air conditioner or the like, in the usual image 90 at the display device 20, the proposal image 80 that relates to a traveling function such as lane change assist or the like is displayed on the display device 20. In this case, during the operation standby time period, the selecting operation of the driver is not reflected in the traveling function. Namely, the vehicle 12 of the present embodiment suppresses erroneous operation in which the selecting operation of the driver with respect to a comfort function is erroneously reflected in an instruction for a traveling function.

At the display control device 30 of the present embodiment, during the operation standby time period from the start of display of the proposal image 80 on the display device 20, even if an operation signal that accompanies operation of the touch pad 40 is received, that operation signal being reflected in the instruction for the proposal is prohibited. Or, during the operation standby time period from the start of display of the proposal image 80, the input of an operation signal that accompanies operation of the touch pad 40 is itself stopped. Namely, in accordance with the present embodiment, in a case in which a new proposal that involves an instruction is displayed on the display device 20 in the midst of a selecting operation by the driver with respect to information that is being displayed on the display device 20, the selecting operation of the driver, which is carried out on the information that was displayed first, being erroneously reflected in the instruction for the new proposal is suppressed.

Further, during the operation standby time period, the display control device 30 of the present embodiment displays the item image 82 in a greyed-out manner, and does not carry out the instruction display 83 on the items. In accordance with the present embodiment, in a case in which the new proposal image 80 that involves an instruction is displayed on the display device 20 in the midst of a selecting operation of the driver at the usual image 90 that is being displayed on the display device 20, the driver can be made to recognize the contents of the proposal while the driver is shown that his/her selecting operation at the touch pad 40 is not being reflected in the instruction. Further, by carrying out display with the item image 82 displayed in a greyed-out manner on the display device 20, the driver erroneously thinking that the selecting operation is not being reflected and that a fault has occurred can be suppressed.

Second Embodiment

In the second embodiment, the method of displaying the proposal image 80 in the mode of the initial stage of interruption differs from in the first embodiment. Hereinafter, the points that differ from the first embodiment are described.

In a case in which proposal information is received, the control section 220 of the present embodiment displays the contents image 81 on the display device 20, and, during the operation standby time period, displays the item image 82 and does not carry out the instruction display 83.

In accordance with the present embodiment, operation and effects that are similar to those of the vehicle control system 10 of the first embodiment can be obtained. In particular, in accordance with the present embodiment, the driver can be made to recognize the items that are included in the item image 82, in addition to the contents of the proposal included in the contents image 81.

Third Embodiment

In the third embodiment, the method of displaying the proposal image 80 in the mode of the initial stage of interruption differs from in the respective embodiments. Hereinafter, the points that differ from the respective embodiments are described.

In a case in which proposal information is received, the control section 220 of the present embodiment displays the contents image 81 on the display device 20, and, during the operation standby time period, does not display the item image 82 and does not carry out the instruction display 83.

In accordance with the present embodiment, operation and effects that are similar to those of the vehicle control system 10 of the first embodiment can be obtained. In particular, in accordance with the present embodiment, in a case in which the new proposal image 80 that involves an instruction is displayed on the display device 20 in the midst of the selecting operation of the driver on the usual image 90 that is being displayed on the display device 20, the driver can be made to recognize only the contents of the proposal that was first included in the contents image 81.

Fourth Embodiment

In the fourth embodiment, the method of displaying the proposal image 80 in the mode of the initial stage of interruption differs from in the respective embodiments. Hereinafter, the points that differ from the first embodiment are described.

Figure 7A:
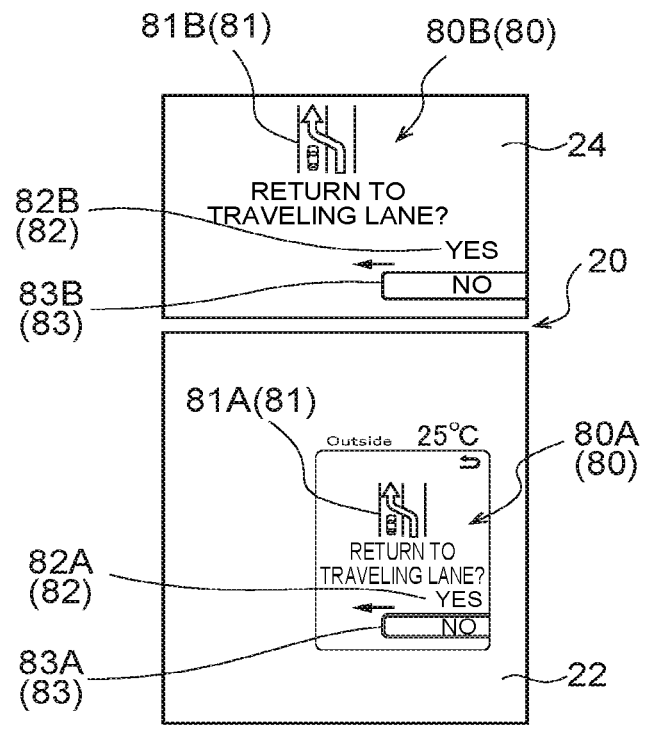
FIG. 7A is a drawing showing examples of images displayed on a display device of a fourth embodiment, and shows proposal images in a mode of the initial stage of interruption.
Figure 7B:
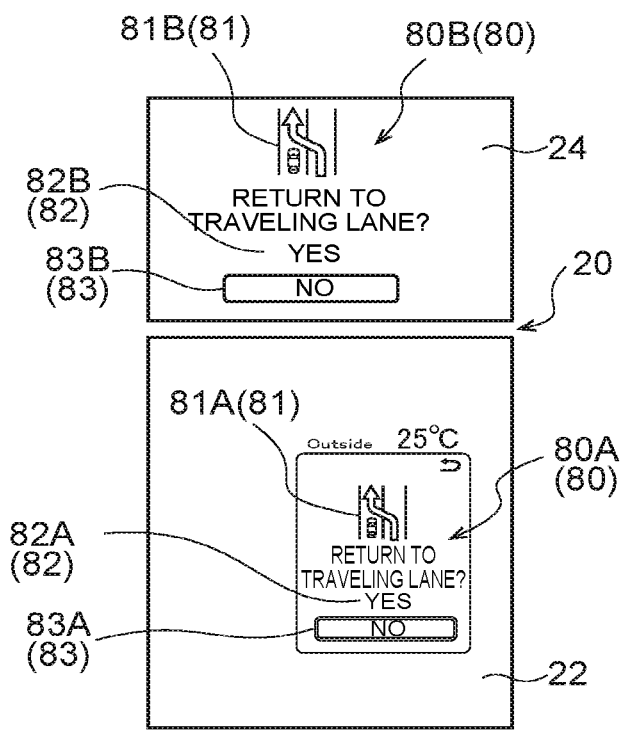
FIG. 7B is a drawing showing examples of images displayed on the display device of the fourth embodiment, and shows proposal images of a usual interruption mode.
Figure 7C:
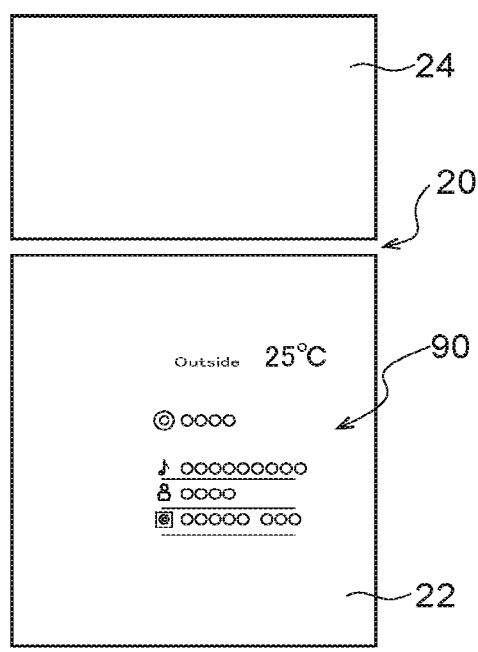
FIG. 7C is a drawing showing an example of an image displayed on the display device of the fourth embodiment, and shows a usual image.

In a case in which proposal information is received, the control section 220 of the present embodiment displays the contents image 81 on the display device 20, and, during the time period from the receipt of the proposal information until the operation standby time period elapses, causes the item image 82, in which the instruction display 83 is being carried out, to fade-in from a lateral side (see FIG. 7A). Note that in the usual interruption mode the method of displaying the proposal image 80, and the method of displaying the usual image 90, are the same as in the first embodiment (see FIG. 7B and FIG. 7C).

In accordance with the present embodiment, operation and effects that are similar to those of the vehicle control system 10 of the first embodiment can be obtained. In particular, in accordance with the present embodiment, the driver can understand the passage of the operation standby time period due to the movements of the item image 82 and the instruction display 83.

Fifth Embodiment

In the fifth embodiment, the method of displaying the proposal image 80 in the mode of the initial stage of interruption differs from in the respective embodiments. Hereinafter, the points that differ from the fourth embodiment are described.

In a case in which proposal information is received, the control section 220 of the present embodiment displays the contents image 81 on the display device 20, and, after the operation standby time period elapses, causes the item image 82, in which the instruction display 83 is being carried out, to fade-in from a lateral side.

In accordance with the present embodiment, operation and effects that are similar to those of the vehicle control system 10 of the first embodiment can be obtained. In particular, in accordance with the present embodiment, the driver can understand that the selecting operation is reflected in the instruction due to the movements of the item image 82 and the instruction display 83.

Sixth Embodiment

In the sixth embodiment, the method of displaying the proposal image 80 in the mode of the initial stage of interruption differs from in the respective embodiments. Hereinafter, the points that differ from the fourth embodiment are described.

In a case in which proposal information is received, the control section 220 of the present embodiment displays the contents image 81 on the display device 20, and during the operation standby time period, starts fading-in of the item image 82, in which the instruction display 83 is carried out, from a lateral side.

In accordance with the present embodiment, operation and effects that are similar to those of the vehicle control system 10 of the first embodiment can be obtained. In particular, in accordance with the present embodiment, the driver can understand, in a short time, that the selecting operation is reflected due to the movements of the item image 82 and the instruction display 83.

[Notes]

In the vehicle control systems 10 of the above-described respective embodiments, when the receiving section 200 receives proposal information, the control section 220 displays the proposal image 80A on the MID 22 instead of the usual image 90. However, as a modified example of display on the MID 22 by the control section 220, there is a case in which the proposal image 80A is superposed on the usual image 90. In this case, at the MID 22, the proposal image 80A is displayed so as to conceal the usual image 90, and, at the HUD 24, the proposal image 80B is newly displayed. Further, as a modified example of display on the MID 22, there a case in which the proposal image 80A is displayed so as to be lined-up with the usual image 90. In this case, at the MID 22, the proposal image 80A is displayed adjacent to the usual image 90, and, at the HUD 24, the proposal image 80B is newly displayed.

The vehicle control systems 10 of the above-described respective embodiments are structured such that a proposal is made to the driver who is seated in the driver's seat of the vehicle 12, and the driver gives an instruction by operating the touch pad 40 that is provided at the steering wheel 18. However, the present disclosure is not limited to this, and may be structured such that a proposal is made to a vehicle occupant other than the driver, and that vehicle occupant gives an instruction by operating a touch pad provided at the dashboard 14 or the like.

In the above-described respective embodiments, the driver is urged by the proposal to select one item from among the items that are included in the item image 82. Concretely, when the driver is to give an instruction, the driver swipes the touch pad 40 and selects an item, and definitively sets that item by pushing on the touch pad 40.

However, the present disclosure is not limited to the same, and the proposal may be a proposal to merely definitively set content that has been provided in advance. An example of this is, a proposal that requests only a definitive setting operation is displayed in the proposal image 80, and the driver merely push-operates the touch pad 40.

Due to the driver operating the touch pad 40, the control sections 220 of the above-described respective embodiments effect display such that the instruction display 83 moves between the items in the item image 82. However, the present disclosure is not limited to this, and the control section 220 may fix the displayed position of the instruction display 83, and the item image 82 may be scrolled-through accompanying the driver's operation of the touch pad 40.

In the above-described embodiments, the touch pad 40 is an example of the operation device that the driver operates. However, the present disclosure is not limited to this, and a device such as a button switch, a lever switch, a voice input system or the like may be used as the operation device.

Note that any of various types of processors other than a CPU may execute the various processings that the CPU 32 executes by reading out software (a program) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the above-described receiving processing may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above respective embodiments describe a form in which the program is stored in advance (is installed) in a non-transitory storage medium that can be read by a computer. For example, the processing program 100 is stored in advance in the ROM 33. However, the present disclosure is not limited to this, and the processing program 100 may be provided in a form of being recorded on a non-transitory storage medium such as a CD-ROM (Compact Disc Read Only Memory), a DVD-ROM (Digital Versatile Disc Read Only Memory), a USB (Universal Serial Bus) memory, or the like. Further, the processing program 100 may be in a form of being downloaded from an external device via a network.

The flow of processings described in the above embodiments are examples, and unnecessary steps may be deleted, new steps may be added, or the order of processings may be rearranged, within a scope that does not depart from the gist of the present disclosure.

What is claimed is:

1. A display control device comprising a processor, wherein the processor is configured to:
    receive proposal information relating to a proposal that requests an instruction from a vehicle occupant of a vehicle;
    receive an operation signal that is outputted in accordance with an operation of the vehicle occupant; and
    display an image for proposal information received that includes a proposal image relating to the proposal on a display device, and prohibit reflection of the operation signal in the instruction during a predetermined time period from a start of the display of the proposal image, wherein:
        the proposal image includes a first image that is an image showing contents of the proposal, a second image that is an image of a plurality of items representing a definitive setting operation to the vehicle that can be selected, and a third image that is an image overlaying at least a part of the second image and indicating a selection of one of the plurality of items of the second image based on a selection operation from the vehicle occupant with respect to the proposal, wherein the selection operation is a precursor to the definitive setting operation and does not execute the definitive setting operation represented by the plurality of items, and wherein the third image indicates only one of the plurality of items and is displayed in a condition indicating a refusal of a selection of the definitive setting operation,
        in a case of receiving an operation via a user input executing the definitive setting operation, the processor is configured to execute a control of the vehicle corresponding to the one of the plurality of items of the second image selected by the selection operation,
        in a case of receiving the proposal information, the processor is configured to cause the first image to be displayed, while delaying display of the second image and the third image until after the predetermined period of time passes,
        the operation signal is received via an operation device at a steering wheel,
        the selection operation is an operation detected based on a detection result by an electrostatic capacitance sensor disposed at the steering wheel,
        the definitive setting operation is an operation detected based on a detection result by a push switch disposed at the steering wheel,
        the proposal image is an image that presents proposal information from a first electronic control unit (ECU) that controls operations of the vehicle, and a control of the vehicle is executed by at least a second ECU that is different from the first ECU, from which the proposal information is sent, in a case in which the selection operation or the definitive setting operation is executed during a time period when the proposal image is not displayed,
        the display of the proposal image is maintained irrespective of a time from the start of the display of the proposal image,
        the display device includes a first display portion that can be seen by the vehicle occupant, and a second display portion that is displayed above the first display portion and on a sightline of the vehicle occupant, and
        the processor is further configured to display the first image only on the first display portion while delaying display of the second image, and to display the first image concurrently with the second image on both the first display portion and the second display portion concurrently after the predetermined period of time passes.

2. The display control device of claim 1, wherein:
    in a case of receiving the proposal information, the processor is configured to display the first image at the display device, and, during a time period from receipt of the proposal information until elapsing of the predetermined period of time in which reflection of the operation signal in the instruction is prohibited, to complete fading-in of the second image at which the instruction display is carried out.

3. The display control device of claim 1, wherein:
in a case of receiving the proposal information, the processor is configured to display the first image at the display device, and, after elapsing of the predetermined period of time in which reflection of the operation signal in the instruction is prohibited, to start fading-in of the second image at which the instruction display is carried out.

4. The display control device of claim 1, wherein:
in a case of receiving the proposal information, the processor is configured to display the first image at the display device, and, during the predetermined period of time in which reflection of the operation signal in the instruction is prohibited, to start fading-in of the second image at which the instruction display is carried out.

5. The display control device of claim 1, wherein, in a case in which the instruction for the proposal is set definitively by the operation signal, or in a case in which the proposal is withdrawn, the processor is configured to change the image that includes the proposal image to a usual image.

6. A vehicle comprising:
the display control device of claim 1;
the operation device that receives operation of the vehicle occupant; and
the display device.

7. The vehicle of claim 6, the processor is further configured to:
in a case of receiving the proposal information, change display of the display device provided within the vehicle from a usual image to an image that includes the proposal image relating to the proposal,
wherein the proposal image is an image that presents the proposal, which relates to a traveling function of the vehicle, and the usual image is an image relating to comfort functions of the vehicle.

8. The vehicle of claim 6, wherein the proposal image relates to a traveling function of the vehicle.

9. The vehicle of claim 8, wherein the traveling function controls an operation of the vehicle.

10. The display control device of claim 1, wherein the first ECU is at least one of a vehicle control ECU, an engine ECU, a brake ECU, a body ECU, and a camera ECU.

11. The display control device of claim 1, wherein the operation signal received via the operation device disposed at the steering wheel controls an operation of the vehicle and the proposal image relates to a traveling function that controls an operation of the vehicle.

12. The display control device of claim 1, wherein:
the proposal image is a suggestion as to whether or not to change lanes while a lane change assist is in operation, and the display of the proposal image is erased when a driver changes lanes to a travel lane on their own.

13. The display control device of claim 1, wherein:
in a case of receiving the selection operation, the processor is configured to change an appearance of the second image while an appearance of the third image remains unchanged.

14. The display control device of claim 1, wherein:
in a case of receiving the selection operation, the processor is configured to change an appearance of the third image while an appearance of the second image remains unchanged.

15. The display control device of claim 1, wherein:
the third image includes a frame surrounding the one of the plurality of items of the second image.

16. A display control method comprising:
receiving proposal information relating to a proposal that requests an instruction from a vehicle occupant of a vehicle;
receiving an operation signal, which is outputted in accordance with an operation of the vehicle occupant; and
displaying, on a display device, proposal information as an image that includes a proposal image relating to the proposal, and prohibiting reflection of the operation signal in the instruction during a predetermined time period from a start of the display of the proposal image,
wherein:
the proposal image includes a first image that is an image showing contents of the proposal, a second image that is an image of a plurality of items representing a definitive setting operation to the vehicle that can be selected, and a third image that is an image overlaying at least a part of the second image and indicating a selection of one of the plurality of items of the second image based on a selection operation from the vehicle occupant with respect to the proposal, wherein the selection operation is a precursor to the definitive setting operation and does not execute the definitive setting operation represented by the plurality of items, and wherein the third image indicates only one of the plurality of items and is displayed in a condition indicating a refusal of a selection of the definitive setting operation,
in a case of receiving an operation via a user input executing the definitive setting operation, the method further comprises executing a control of the vehicle corresponding to the one of the plurality of items of the second image selected by the selection operation, and
in a case of receiving the proposal information, the method further comprises causing the first image to be displayed, while delaying display of the second image and the third image until after the predetermined period of time passes,
the operation signal is received via an operation device at a steering wheel,
the selection operation is an operation detected based on a detection result by an electrostatic capacitance sensor disposed at the steering wheel,
the definitive setting operation is an operation detected based on a detection result by a push switch disposed at the steering wheel,
the proposal image is an image that presents proposal information from a first electronic control unit (ECU) that controls operations of the vehicle, and a control of the vehicle is executed by at least a second ECU that is different from the first ECU, from which the proposal information is sent, in a case in which the selection operation or the definitive setting operation is executed during a time period when the proposal image is not displayed,
the display of the proposal image is maintained irrespective of a time from the start of the display of the proposal image,
the display device includes a first display portion that can be seen by the vehicle occupant, and a second display portion that is displayed above the first display portion and on a sightline of the vehicle occupant, and displaying the first image only on the first display portion while delaying display of the second image, and the method further comprises displaying the first image concurrently with the second image on both the first display portion and the second display portion concurrently after the predetermined period of time passes.

17. A non-transitory storage medium storing a program executable by a computer to perform processing, the processing comprising:

receiving proposal information relating to a proposal that requests an instruction from a vehicle occupant of a vehicle;

receiving an operation signal, which is outputted in accordance with an operation of the vehicle occupant; and displaying, on a display device, proposal information received as an image that includes a proposal image relating to the proposal, and prohibiting reflection of the operation signal in the instruction during a predetermined time period from a start of the display of the proposal image, wherein:

the proposal image includes a first image that is an image showing contents of the proposal, a second image that is an image of a plurality of items representing a definitive setting operation to the vehicle that can be selected, and a third image that is an image overlaying at least a part of the second image and indicating a selection of one of the plurality of items of the second image based on a selection operation from the vehicle occupant with respect to the proposal, wherein the selection operation is a precursor to the definitive setting operation and does not execute the definitive setting operation represented by the plurality of items, and wherein the third image indicates only one of the plurality of items and is displayed in a condition indicating a refusal of a selection of the definitive setting operation, in a case of receiving an operation via a user input executing the definitive setting operation, the processing further comprises executing a control of the vehicle corresponding to the one of the plurality of items of the second image selected by the selection operation, and in a case of receiving the proposal information, the processing further comprises causing the first image to be displayed, while delaying display of the second image and the third image until after the predetermined period of time passes, the operation signal is received via an operation device at a steering wheel, the selection operation is an operation detected based on a detection result by an electrostatic capacitance sensor disposed at the steering wheel, the definitive setting operation is an operation detected based on a detection result by a push switch disposed at the steering wheel, the proposal image is an image that presents proposal information from a first electronic control unit (ECU) that controls operations of the vehicle, and a control of the vehicle is executed by at least a second ECU that is different from the first ECU, from which the proposal information is sent, in a case in which the selection operation or the definitive setting operation is executed during a time period when the proposal image is not displayed, the display of the proposal image is maintained irrespective of a time from the start of the display of the proposal image, the display device includes a first display portion that can be seen by the vehicle occupant, and a second display portion that is displayed above the first display portion and on a sightline of the vehicle occupant, and displaying the first image only on the first display portion while delaying display of the second image, and the processing further comprises displaying the first image concurrently with the second image on both the first display portion and the second display portion concurrently after the predetermined period of time passes.

* * * * *